United States Patent
Takakubo et al.

(10) Patent No.: US 8,395,854 B2
(45) Date of Patent: Mar. 12, 2013

(54) IMAGING OPTICAL SYSTEM AND IMAGING APPARATUS

(75) Inventors: Yutaka Takakubo, Saitama (JP); Eijiroh Tada, Saitama (JP)

(73) Assignee: Hoya Corporation, Tokyo (JP)

( * ) Notice: Subject to any disclaimer, the term of this patent is extended or adjusted under 35 U.S.C. 154(b) by 19 days.

(21) Appl. No.: 13/217,623

(22) Filed: Aug. 25, 2011

(65) Prior Publication Data
US 2012/0075728 A1    Mar. 29, 2012

(30) Foreign Application Priority Data
Sep. 24, 2010 (JP) ................... 2010-214151

(51) Int. Cl.
*G02B 17/00* (2006.01)
(52) U.S. Cl. .................. 359/737; 359/726; 359/733
(58) Field of Classification Search .................. 359/726, 359/733, 737
See application file for complete search history.

(56) References Cited

U.S. PATENT DOCUMENTS

| | | | |
|---|---|---|---|
| 6,850,279 B1 | 2/2005 | Scherling | |
| 8,120,693 B2 * | 2/2012 | Nomura et al. | 348/335 |
| 2006/0017834 A1 | 1/2006 | Konno et al. | |
| 2006/0092524 A1 | 5/2006 | Konno | |
| 2007/0024739 A1 | 2/2007 | Konno | |
| 2008/0291543 A1 | 11/2008 | Nomura et al. | |

FOREIGN PATENT DOCUMENTS

| | | |
|---|---|---|
| JP | 2006-58840 | 3/2006 |
| JP | 2006-154702 | 6/2006 |
| JP | 2007-33819 | 2/2007 |

* cited by examiner

*Primary Examiner* — William Choi
(74) *Attorney, Agent, or Firm* — Greenblum & Bernstein P.L.C.

(57) ABSTRACT

An imaging optical system, including an imaging lens group, an image side prism having an entrance surface a reflection surface and an exit surface from which light exits toward an image pickup device, and a first shielding member shielding at least a part of a region on the entrance surface, wherein the region on the entrance surface is located from an edge line of an apex between the entrance surface and the exit surface to a position corresponding to a height h from the edge line, and when L represents a length of the exit surface, α represents an angle formed between the reflection surface and the exit surface, n represents a refractive index of a surrounding area of the image side prism, and n' represents a refractive index of the image side prism, the height h satisfies a following condition: $h = L \times \cos\{\alpha + \sin^{-1}(n/n')\}$.

22 Claims, 12 Drawing Sheets

IMAGING OPTICAL SYSTEM AND IMAGING APPARATUS

BACKGROUND OF THE INVENTION

The present invention relates to an imaging optical system, and an imaging apparatus having the imaging optical system.

Recently, digital cameras, digital video cameras and digital electronic devices in which an imaging module is mounted, such as a mobile phone, a PDA (Personal Digital Assistant), a PND (Portable Navigation Device), a PHS (Personal Handy phone System), a portable game machine and a notebook computer, have become widespread. Such cameras and digital electronic devices include a device in which an imaging optical system (a so-called bending optical system) configured to have an optical path elongated in a direction orthogonal to a direction of thickness of a device body is mounted so as to decrease the thickness of the device body. Hereafter, for convenience of explanation, the direction of thickness of a device body is referred to as "a case thickness direction", and the direction orthogonal to the case thickness direction is referred to as "a case surface direction".

Incidentally, when an optical path is directed to the case surface direction, a sensor surface of an image pickup chip needs to be positioned to be parallel with the case thickness direction so that an object image can be incident on the sensor surface of the image pickup chip. However, since an outer dimension of the image pickup chip in the sensor surface direction is large, it becomes difficult to design a device body case to be thin when the sensor surface is positioned to be parallel with the case thickness direction.

Each of Japanese Patent Provisional Publications No. 2006-058840A, No. 2006-154702A and No, 2007-033819A discloses an imaging optical system configured to decrease the dimension in the case thickness direction by positioning a sensor surface of an image pickup chip to be parallel with the case surface direction. Specifically, in the imaging optical system disclosed in these publications, a prism is arranged immediately before the image pickup chip and an optical path is bent to the case thickness direction.

SUMMARY OF THE INVENTION

In the imaging optical system disclosed in each of the above described publications, the prism is located immediately before the image pickup device. Therefore, unwanted light not contributing to normal image formation is caused, and the unwanted light appears on an image as a ghost or flare. The ghost or flare may result in an unintended image or decreasing of the contrast. That is, the ghost or flare deteriorates the image quality. However, none of the above described publications discusses such a problem of the ghost and flare caused by arranging the prism immediately before the image pickup chip. None of the above described publications discloses or suggests measures for solving the problem.

The present invention is advantageous in that it provides an imaging optical system and an imaging apparatus configured to decrease the thickness of the imaging apparatus while preventing occurrence of unwanted light by a prism located immediately before an image pickup chip.

According to an aspect of the invention, there is provided an imaging optical system, which is provided with an imaging lens group having at least one lens, an image side prism having an entrance surface on which light passed through the imaging lens group is incident, a reflection surface from which the light passed through the entrance surface reflects, and an exit surface from which the light reflected from the reflection surface exits toward an image pickup device located at a predetermined position, and a first shielding member formed to shield at least a part of a region on the entrance surface of the image side prism. The region on the entrance surface is located from an edge line of an apex between the entrance surface and the exit surface to a position corresponding to a height h from the edge line. When L represents a length of the exit surface defined in a cross sectional plane orthogonal to both of the entrance surface and the exit surface, $\alpha$ represents an angle formed in the cross sectional plane between the reflection surface and the exit surface, n represents a refractive index of a surrounding area of the image side prism, and n' represents a refractive index of the image side prism, the height h satisfies a following condition (1):

$$h = L \times \cos\{\alpha + \sin^{-1}(n/n')\} \qquad (1).$$

With this configuration, unwanted light not contributing to normal image formation, namely the light outside the field angle incident on the image pickup device after totally reflecting from the exit surface and the reflection surface of the image side prism in this order is blocked. Therefore, a ghost or flare can be reduced and thereby deterioration of the image can be suppressed. That is, it is possible to effectively suppressing occurrence of a ghost or flare in a bending optical system which is advantageous in designing an imaging apparatus to be thin.

In at least one aspect, the first shielding member may be located between the image side prism and one of lenses of the imaging lens group closest to an image plane of the imaging lens group.

In at least one aspect, the first shielding member may be attached to the entrance surface of the image side prism.

In at least one aspect, the imaging optical system may further include a cover glass provided for the image pickup device to transmit light emerging from the exit surface of the image side prism toward the image pickup device, and a second shielding member that blocks light incident directly on the cover glass from the imaging lens group without passing through the image side prism.

In at least one aspect, the second shielding member may be located between one of lenses of the imaging lens group closest to an image plane of the imaging lens group and at least one of a space between the image side prism and the cover glass and a side face of the cover glass facing the one of lenses of the imaging lens group closest to the image plane.

In at least one aspect, the second shielding member may be attached to the side face of the cover glass.

In at least one aspect, the second shielding member may be integrated with the first shielding member.

In at least one aspect, the reflection surface of the image side prism may be provided with one of an antireflection coating and an antireflection structure. With this configuration, occurrence of a ghost or flare can be further suppressed.

In at least one aspect, the image side prism may be a right angle prism formed to bend an optical path by approximately 90°. With this configuration, the sensor surface of the image pickup device can be positioned to be parallel with the case surface direction while securing a long optical path in the case surface direction, and therefore the dimension of the case in the case thickness direction can be decreased.

In at least one aspect, the imaging optical system may further include an object side prism located on an object side with respect to the image side prism. The object side prism is arranged such that at least one lens of lenses of the imaging lens group is located between the object side prism and the image side prism.

In at least one aspect, the object side prism may be a right angle prism formed to bend an optical path by approximately 90°. With this configuration, light proceeding from an object in the case thickness direction can be bent toward the case surface direction.

According to another aspect of the invention, there is provided an imaging apparatus, which is provided with one of the above described imaging optical system, and the image pickup device arranged such that a sensor surface of the image pickup device is positioned on an image plane of the imaging optical system.

DETAILED DESCRIPTION OF THE EMBODIMENTS

Hereinafter, an embodiment according to the invention is described with reference to the accompanying drawings.

Figure 1A:
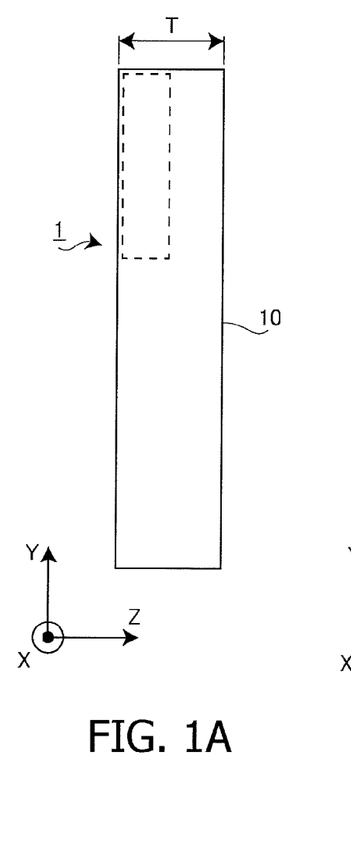
FIGS. 1A and 1B illustrate a configuration of an imaging apparatus according to an embodiment of the invention.
Figure 1B:
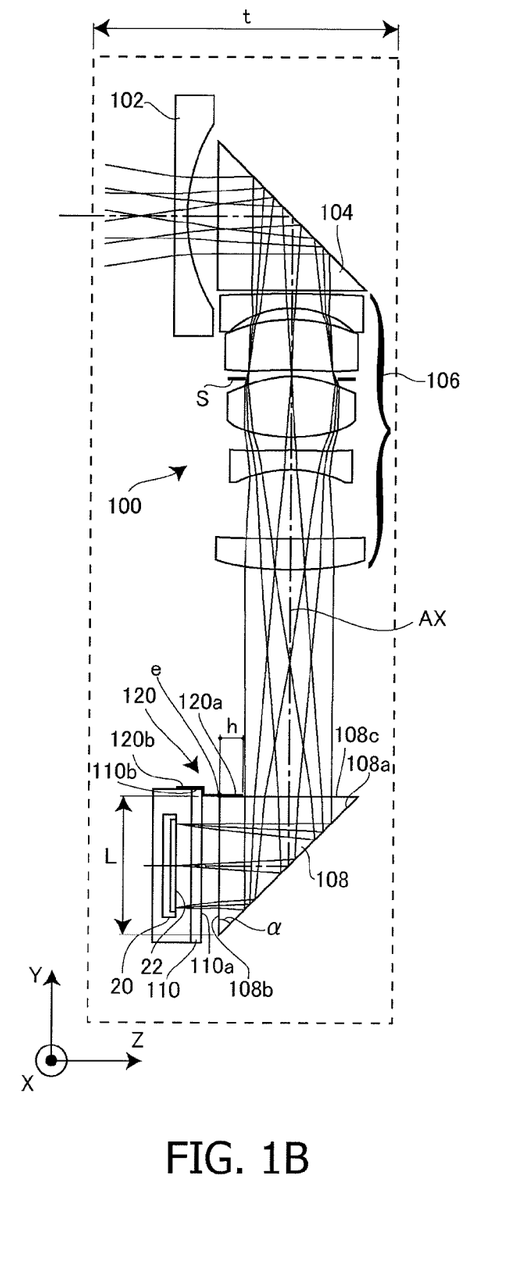

FIGS. 1A and 1B illustrate a configuration of an imaging apparatus 1 according to the embodiment of the invention. In FIGS. 1A and 1B, an optical configuration of the imaging apparatus 1 (i.e., a substantial part of the embodiment) is illustrated, and a mechanical configuration and a circuit configuration which are not substantial parts of the embodiment are omitted for the sake of simplicity. In this embodiment, the imaging apparatus 1 is, for example, a mobile phone. However, in another embodiment, the imaging apparatus 1 may be a digital camera, a digital video camera or a digital electronic device in which an imaging module is mounted, such as a mobile phone, PDA, PND, PHS, a portable game machine and a notebook computer. Alternatively, the imaging apparatus 1 may be an imaging module.

As shown in FIG. 1A, the imaging apparatus 1 includes a case 10 having a thickness T. In FIG. 1A, for convenience of explanation, the direction of the thickness T of the case 10 is defined as a Z axis direction, and two directions which are perpendicular to the Z axis direction and are perpendicular to each other are defined as a X axis direction (perpendicular to a paper face of FIGS. 1A and 1B) and a Y axis direction (parallel with the paper face of FIGS. 1A and 1B). An internal block diagram of a box indicated by a dashed line in FIG. 1A is illustrated in FIG. 1B. As shown in FIG. 1B, the imaging apparatus 1 includes an imaging optical system 100. The imaging optical system 100 includes an objective lens 102, an object side prism 104, an imaging lens group 106, an image side prism 108 and a cover glass 110. Each of the object side prism 104 and the image side prism 108 is a right angle prism configured to bend an optical path by 90°. In the imaging lens group 106, an aperture stop S is arranged. In FIG. 1B, a chain line represents an optical axis AX of the imaging optical system 100.

Light proceeding in the Z axis direction (i.e., the case thickness direction) from an object is incident on the objective lens 102 and is bent toward the Y axis direction (i.e., the case surface direction) by the object side prism 104. Then, the light passes through the imaging lens group 106, and is bent again toward the Z axis direction by a reflection surface 108a of the image side prism 108. The light which has reflected from the reflection surface 108a passes through an exit surface 108b of the image side prism 108, and passes through the cover glass 110. The cover glass 110 seals an image pickup chip 20 adhered to a resin package. The light which has passed through the cover glass 100 is incident, within an effective pixel area of a sensor surface 22, on the sensor surface 22 of the image pickup chip 20. The image pickup chip 20 is arranged such that the sensor surface 22 is parallel with the XY plane so as to let the light bent toward the Z axis direction by the reflection surface 108a be perpendicularly incident on the affective pixel area of the sensor surface 22. By thus arranging the image pickup chip 20 having a larger dimension in the sensor surface direction, it becomes possible to decrease, in the Z axis direction, the dimension t of a block including the imaging optical system 100 and the image pickup chip 20. As a result, the thickness T of the case 10 can be decreased, and the imaging apparatus 1 can be formed to be thin.

The image pickup chip 20 is, for example, a single-chip color CMOS (Complementary Metal Oxide Semiconductor) image sensor having a bayer layout. The sensor surface 22 of the image pickup chip 20 is located on an image plane of the imaging lens group 106. The image pickup chip 20 accumulates, at each pixel, charges responsive to a light amount of an optical image formed on the sensor surface 22, and converts the charges into an image signal. The image signal is input to an image processing engine (not shown). The image processing engine executes various types of image processing, such as, generating an image by processing the image signal, displaying the generated image and recording the generated image in a recording medium. The image pickup chip 20 is not limited to the CMOS sensor chip, and various types of image pickup chips (e.g., a CCD (Charge Couple Device) image sensor chip) may be used as the image pickup chip 20.

Figure 2:
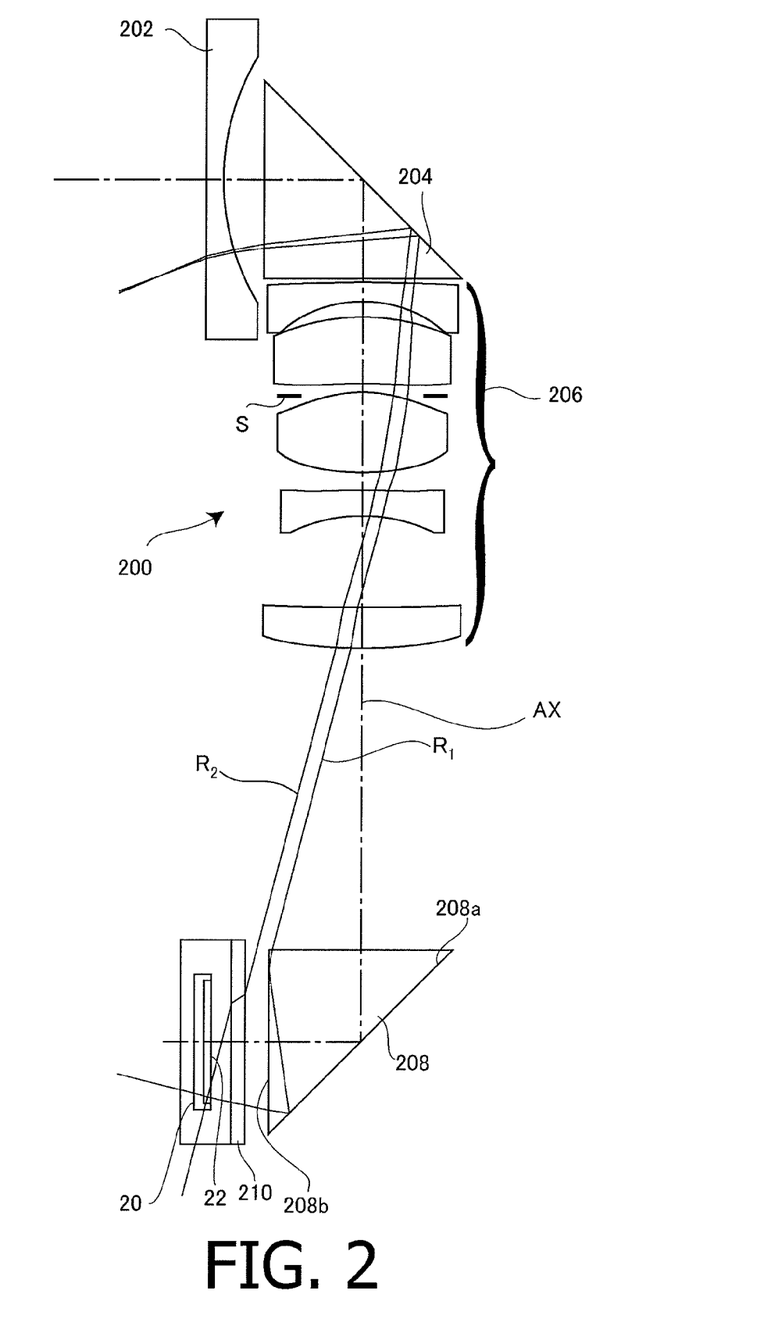
FIG. 2 illustrates a configuration of a conventional imaging optical system.

Incidentally, with regard to an optical path between the image side prism 108 and the image pickup chip 20, there is no space for arranging a mask for blocking only the unwanted light without blocking normal light contributing to the normal image formation. Therefore, there is a concern that the unwanted light caused by the image side prism 108 appears on the image as a ghost or flare and thereby deteriorates the quality of the image. FIG. 2 is an explanatory illustration for explaining an example of a ghost or flare caused by unwanted light in a conventional imaging optical system 200. In FIG. 2, to elements which are substantially the same as those of the embodiment, the same reference numbers are assigned and explanations thereof will not be repeated. In FIG. 2, light rays R1 and R2 are on the outside of the maximum field angle (hereafter, light on the outside of the maximum field angle is simply referred to as "light outside the field angle"), and, according to a design condition, the light rays R1 and R2 are not incident on the effective pixel area of the sensor surface 22.

The conventional imaging optical system 200 shown in FIG. 2 includes an objective lens 202, an object side prism 204, an imaging lens group 206, an image side prism 208 and a cover glass 210. The light ray R1 is incident on the objective lens 202 and is bent by the object side prism 204. Then, the light ray R1 passes through the imaging lens group 206 and is incident on the image side prism 208. Specifically, the light ray R1 is incident on an exit surface 208b of the image side prism 208. The incident angle of the light ray R1 with respect to the exit surface 208b is large and is larger than a critical angle. Therefore, the light ray R1 totally reflects from the exit surface 208b. The totally reflected light ray R1 is incident on a reflection surface 208a of the image side prism 208. After totally reflecting from the reflection surface 208a, the light ray R1 passes through the exit surface 208b. Then, the light ray R1 passes though the cover glass 210, and is incident on the effective pixel area of the sensor surface 22. The light ray R2 is incident on the objective lens 202 and is bent by the object side prism 204. Then, the light ray R2 passes through the imaging lens group 206, and is directly incident on the cover glass 210. Then, the light ray R2 passes through the cover glass 210, and is incident on the effective pixel area of the sensor surface 22. As described above, in the conventional imaging optical system 200, the light outside the field angle which has totally reflected from the exit surface 208b of the image side prism 208 or the light outside the field angle which has directly entered the cover glass 210 from the imaging lens group 206 appears on an image as a ghost or flare, and deteriorates the quality of the image. Furthermore, there is a case where light outside the field angle reflected from a surface of a rim of a lens constituting the imaging optical system or reflected from the inside of the case of the imaging apparatus appears on an image as a ghost or flare, and thereby deteriorates the quality of the image. As light outside the field angle which tends to appear as a ghost or flare on an image, light which lies outside an imaging range and has a high intensity (e.g., sun light or light from a lamp) can be cited.

According to the embodiment, a plate-like shielding member 120 including a first shielding part 120a and a second shielding part 120b is arranged in the imaging optical system 100 in order to prevent occurrence of the ghost or flare of the above described type.

Figure 3:
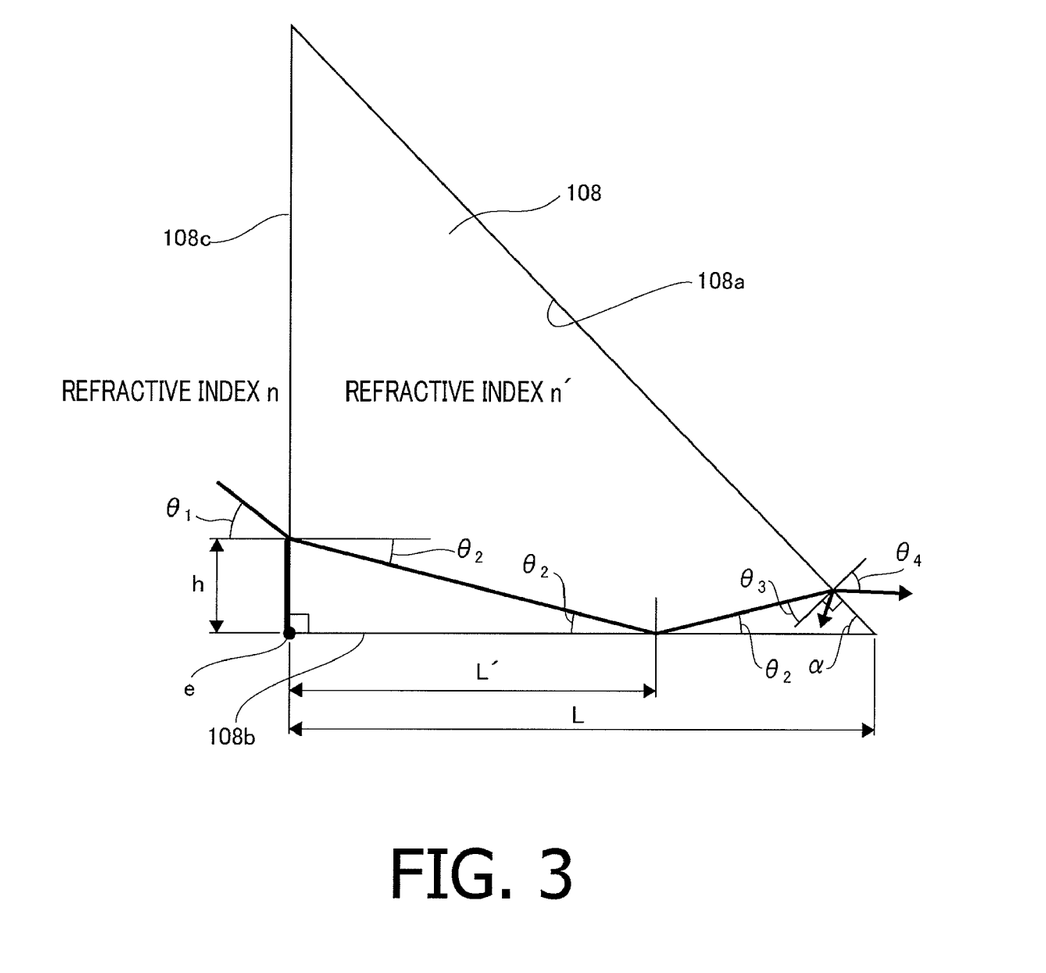
FIG. 3 is an explanatory illustration for explaining how a condition (1) is derived.

The first shielding part 120a is adhered to an entrance surface 108c of the image side prism 108. The first shielding part 120a is provided to shield a region on the entrance surface 108c. The region shielded by the first shielding part 120a expands, from an edge line e of an apex between the entrance surface 108c and the exit surface 108b, to a position corresponding to the height h (i.e., a line shifted by a distance h in the Z axis direction from the edge line e). When L represents the length of the exit surface 108b defined in a cross sectional plane (i.e., the YZ plane in FIG. 1B) orthogonal to both of the entrance surface 108c and the exit surface 108b, α represents an angle (an apex angle) formed in the cross sectional plane between the reflection surface 108a and the exit surface 108b, n represents the refractive index of a surrounding area (air) of the image side prism 108, and n' represents the refractive index of the image side prism 108 (see FIG. 3), the height h satisfies a following condition (1):

$$h = L \times \cos\{\alpha + \sin^{-1}(n/n')\} \quad (1).$$

FIG. 3 is an explanatory illustration for explaining how the condition (1) is derived. For explanation of deriving of the condition (1), we consider a light ray which totally reflects from the exit surface 108b of the image side prism 108 after entering the image side prism 108 through the entrance surface 108c and then impinges on the reflection surface 108a. Depending on an incident angle of the above described light ray with respect to the reflection surface 108a, there are a case where the light ray totally reflects from the reflection surface 108a and a case where the light ray passes through the reflection surface 108a. In the former case, all the light incident on the reflection surface 108a reflects from the reflection surface 108a, proceeds along an optical path which is similar to the optical path of the light ray R1 (see FIG. 2), appears on an image as a ghost or flare and thereby deteriorates the quality of an image. In the latter case, the light ray proceeds outside the effective pixel area of the sensor surface 22 after passing through the reflection surface 108a. Therefore, in the latter case, the light ray does not deteriorate the quality of an image. However, strictly, part of the light reflects on the reflection surface 108a in the latter case. In this case, the amount of reflected light is extremely small (e.g., the intensity of the reflected light is about ⅕ of the transmitted light) because almost all the incident light passes through the reflection surface 108a. Therefore, in the latter case, the reflected light does not actually appear as a ghost or flare on an image, and can be neglected.

In order to further suppress a ghost and flare, an antireflection coating or an antireflection structure may be provided on the reflection surface 108a. Specifically, the antireflection coating or the antireflection structure may be provided in the whole region of the reflection surface 108a (in this case, since the normal light totally reflects from an inside of the reflection surface 108a, the normal light is not affected by the antireflection function of the antireflection coating or the antireflection structure) or may be provided only in a region (i.e. a part of the reflection surface 108a) on which the light outside the field angle totally reflecting from the reflection surface 108b tends to be incident. When the antireflection coating or the antireflection structure is provided on the reflection surface 108a, the intensity of the reflected light can be decreased to, for example, approximately 1/200 of the transmitted light.

When an incident angle and a refraction angle of the light ray with respect to the entrance surface 108c in FIG. 3 are defined as $\theta_1$ and $\theta_2$, respectively, the following equations (2) and (3) are derived.

$$n \cdot \sin\theta_1 = n' \cdot \sin\theta_2 \quad (2)$$

$$\theta_2 = \sin^{-1}\{(n/n')\sin\theta_1\} \quad (3)$$

When an incident angle of the light ray with respect to the reflection surface 108a in FIG. 3 is defined as $\theta_3$, the following equation (4) is derived in accordance with the sum of inner angles of a triangle.

$$\theta_3 = \pi/2 - \alpha - \theta_2 \quad (4)$$

When substituting the equation (3) in the equation (4), $$\theta_3 = \pi/2 - \alpha - \sin^{-1}\{(n/n')\sin\theta_1\}$$

is derived, and thereby the following equation (5) is derived.

$$\sin\theta_1 = (n'/n) \cdot \cos(\alpha + \theta_3) \quad (5)$$

When the distance between the edge line e and an incident point of the light ray on the exit surface 108b is defined as L', $$\tan\theta_2 = h/L',$$

and since $\theta_2$ is small and $\tan\theta_2 \approx \sin\theta_2$, the following equation (6) is derived.

$$\sin\theta_2 = h/L' \quad (6)$$

When substituting the equation (6) in the equation (2), $$n \cdot \sin\theta_1 = n'(h/L')$$

$$h = L'(n/n')\sin\theta_1$$

are derived, and when substituting the equation (5) in this equation, $$h = L' \times \cos(\alpha + \theta_3)$$

is derived.
If the incident angle $\theta_3$ is the critical angle, $$h = L' \times \cos\{\alpha + \sin^{-1}(n/n')\}$$

$$L' = h/\cos\{\alpha + \sin^{-1}(n/n')\}$$

are derived.
As L' becomes closer to L, the amount of light outside the field angle incident on the exit surface 108b decreases. When the following equation (7) is satisfied, the amount of light outside the field angle incident on the exit surface 108b becomes substantially zero.

$$L' = h/\cos\{\alpha + \sin^{-1}(n/n')\} = L \quad (7)$$

When the equation (7) is modified by moving the height h to the left term, the following condition (1) defining that the light outside the field angle is not incident on the exit surface 108b.

$$h = L \times \cos\{\alpha + \sin^{-1}(n/n')\} \quad (1)$$

Figure 4A:
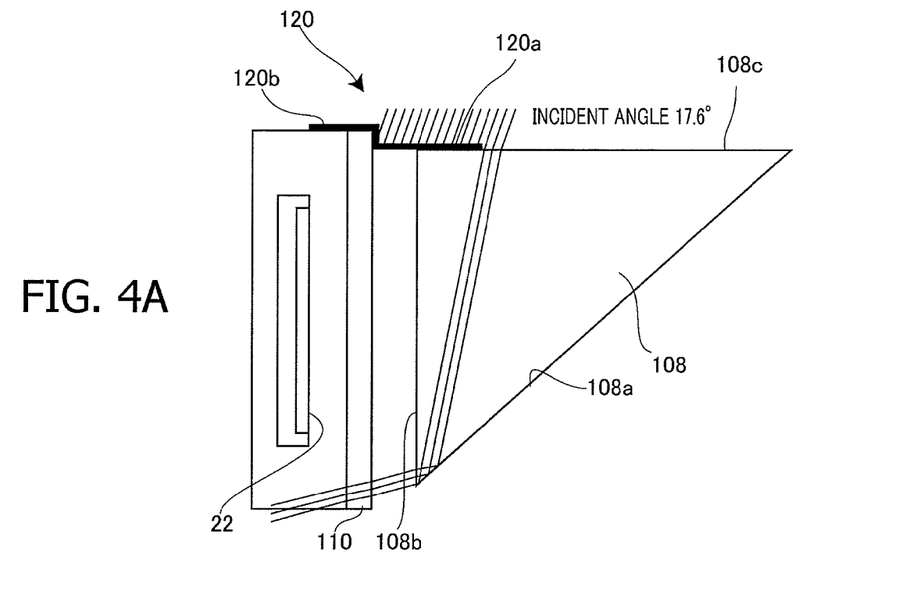
FIGS. 4A and 4B are explanatory illustrations for explaining the relationship between light outside a field angle and a first shielding part.
Figure 4B:
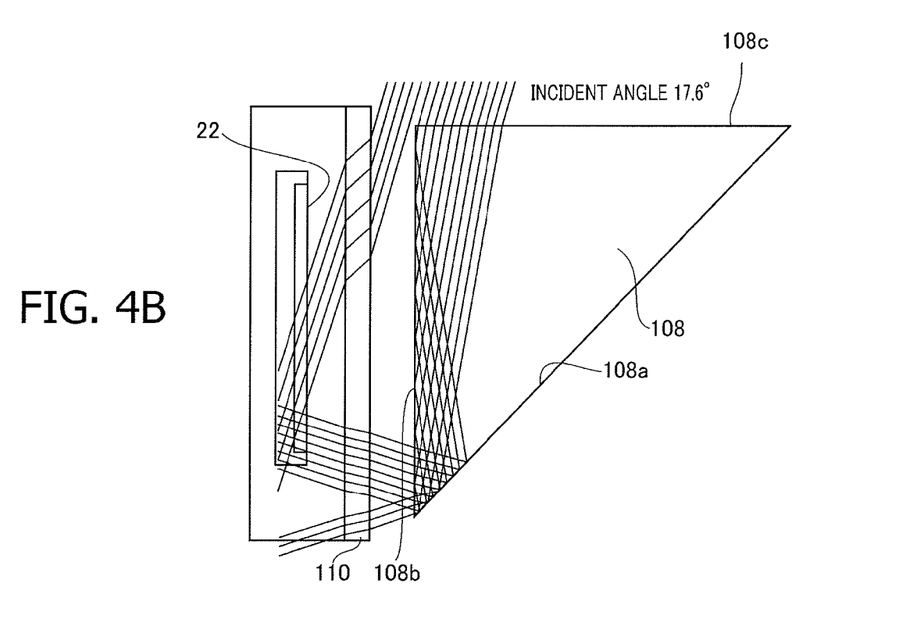
Figure 5A:
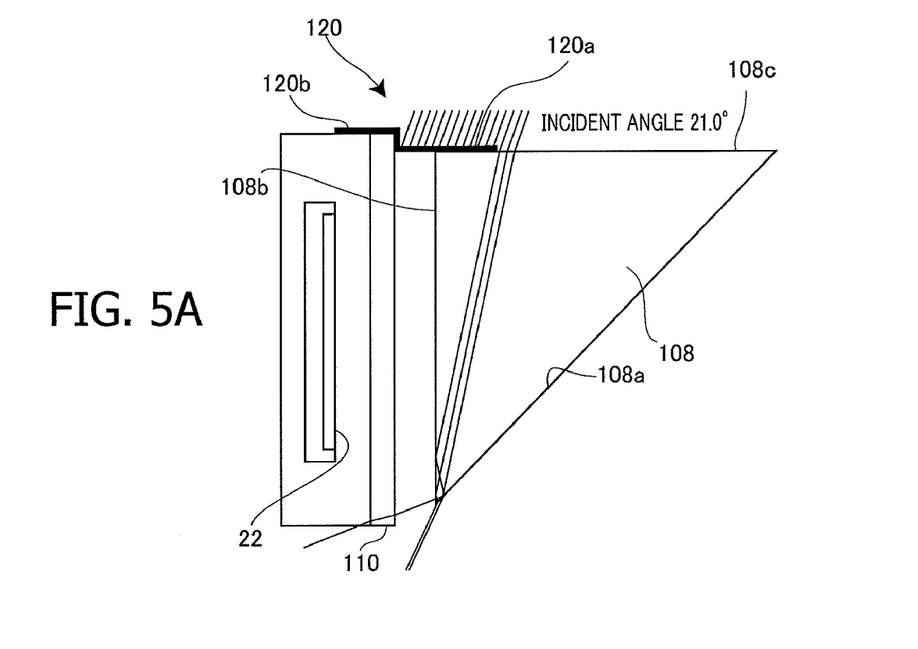
FIGS. 5A and 5B are explanatory illustrations for explaining the relationship between the light outside the field angle and the first shielding part.
Figure 5B:
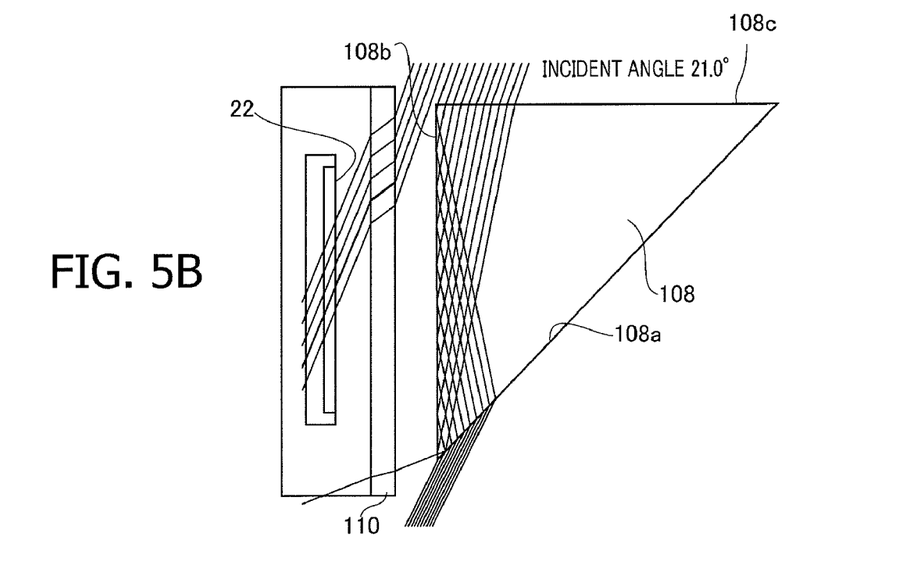
Figure 6A:
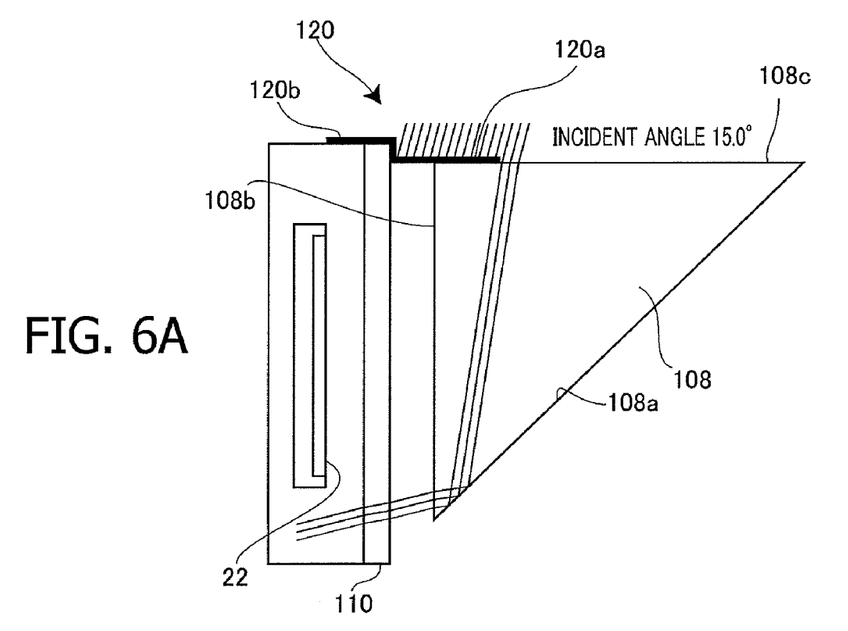
FIGS. 6A and 6B are explanatory illustrations for explaining the relationship between the light outside the field angle and the first shielding part.
Figure 6B:
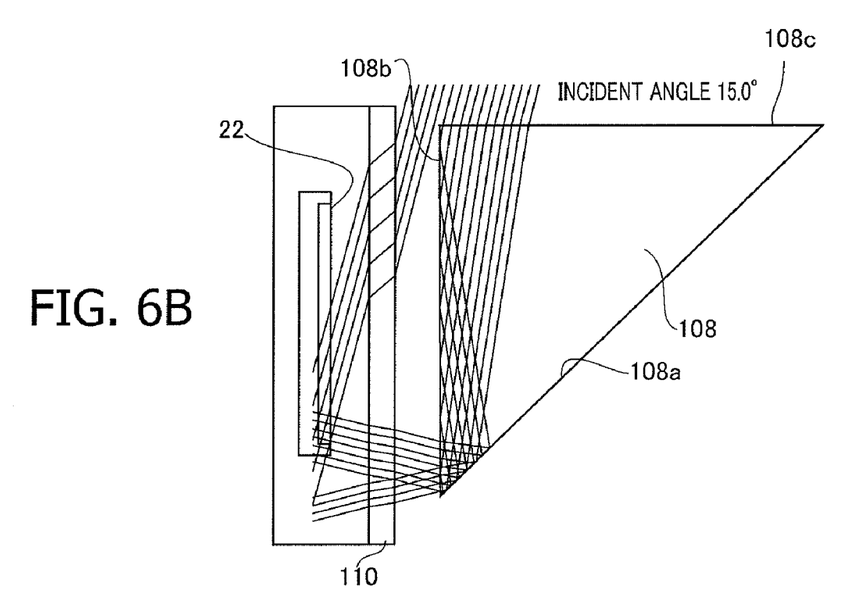

FIGS. 4A, 4B, 5A, 5B, 6A and 6B are explanatory illustrations for explaining the relationship between the light outside the field angle and the first shielding part 120a. All of light rays illustrated in FIGS. 4A, 4B, 5A, 5B, 6A and 6B correspond to the light outside the field angle. In FIGS. 4A and 4B, the incident angle of the light outside the field angle with respect to the entrance surface 108c of the image side prism 108 is 17.6°. In FIGS. 5A and 5B, the incident angle of the light outside the field angle with respect to the entrance surface 108c of the image side prism 108 is 21.0°. In FIGS. 6A and 6B, the incident angle of the light outside the field angle with respect to the entrance surface 108c of the image side prism 108 is 15.0°. Each of FIGS. 4A, 5A and 6A illustrates the situation where the first shielding part 120a is arranged, and each of FIGS. 4B, 5B and 6B illustrates the situation where the first shielding part 120a is not arranged.

As shown as an example in FIGS. 4A and 4B, the first shielding part 120a blocks all the light outside the field angle which totally reflects from the exit surface 108b, but is not able to block the light outside the field angle which is directly incident on the reflection surface 108a. However, the light outside the field angle directly incident on the reflection surface 108a has a large reflection angle with respect to the reflection surface 108a, and propagates to the region outside the effective pixel area of the sensor surface 22. Therefore, the light outside the field angle directly incident on the reflection surface 108a does not appear as a ghost or flare on an image.

As shown as an example in FIGS. 5A and 5B, the first shielding part 120a is not able to block part of the light outside the field angle totally reflecting from the exit surface 108b and the light outside the field angle directly incident on the reflection surface 108a. However, since the light outside the field angle totally reflecting from the exit surface 108b has a small incident angle with respect to the reflection surface 108a, the light outside the field angle totally reflecting from the exit surface 108b passes though the reflection surface 108a, and propagates to the region outside the effective pixel area of the sensor surface 22. Since the light outside the field angle directly incident on the reflection surface 108a has a large reflection angle with respect to the reflection surface 108a, the light outside the field angle directly incident on the reflection surface 108a propagates to the region outside the effective pixel area of the sensor surface 22. That is, all the light outside the field angle not blocked by the first shielding part 120a does not enter the effective pixel area of the sensor surface 22, and therefore does not appear as a ghost or flare on the image.

As shown as an example in FIGS. 6A and 6B, the first shielding part 120a is not able to block part of the light outside the field angle directly incident on the reflection surface 108a. However, since the light outside the field angle directly incident on the reflection surface 108a has a large reflection angle with respect to the reflection surface 108a and propagates to a region outside the effective pixel area of the sensor surface 22, the light outside the field angle directly incident on the reflection surface 108a does not appear as a ghost or flare on the image.

The second shielding part 120b is formed integrally with the first shielding part 120a. The second shielding part 120b has a shape formed by extending the first shielding part 120a to contact the cover glass 110. The second shielding part 120b blocks light entering from the imaging lens group 106 to a space between the image side prism 108 and the cover glass 110. Furthermore, the second shielding prism 120b is formed in a step-like shape to contact an entrance surface 110a and a side surface 110b of the cover glass 110 in this order from the first shielding part 120a side. The second shielding part 120b thus blocks the light entering into the cover glass 110 from the side surface 110b. The second shielding part 120b is adhered to the cover glass 110 at a contact surface between the second shielding part 120b and the entrance surface 110a or the side surface 110b. Adhering one of the first shielding part 120a and the second shielding part 120b to one of the image side prism 108 and the cover glass 110 is enough to fix the position of the shielding member 120. The structure of the shielding member 120 is not limited to the above described embodiment. The first shielding part 120a and the second shielding part 120b may be provided as separate members.

Figure 7:
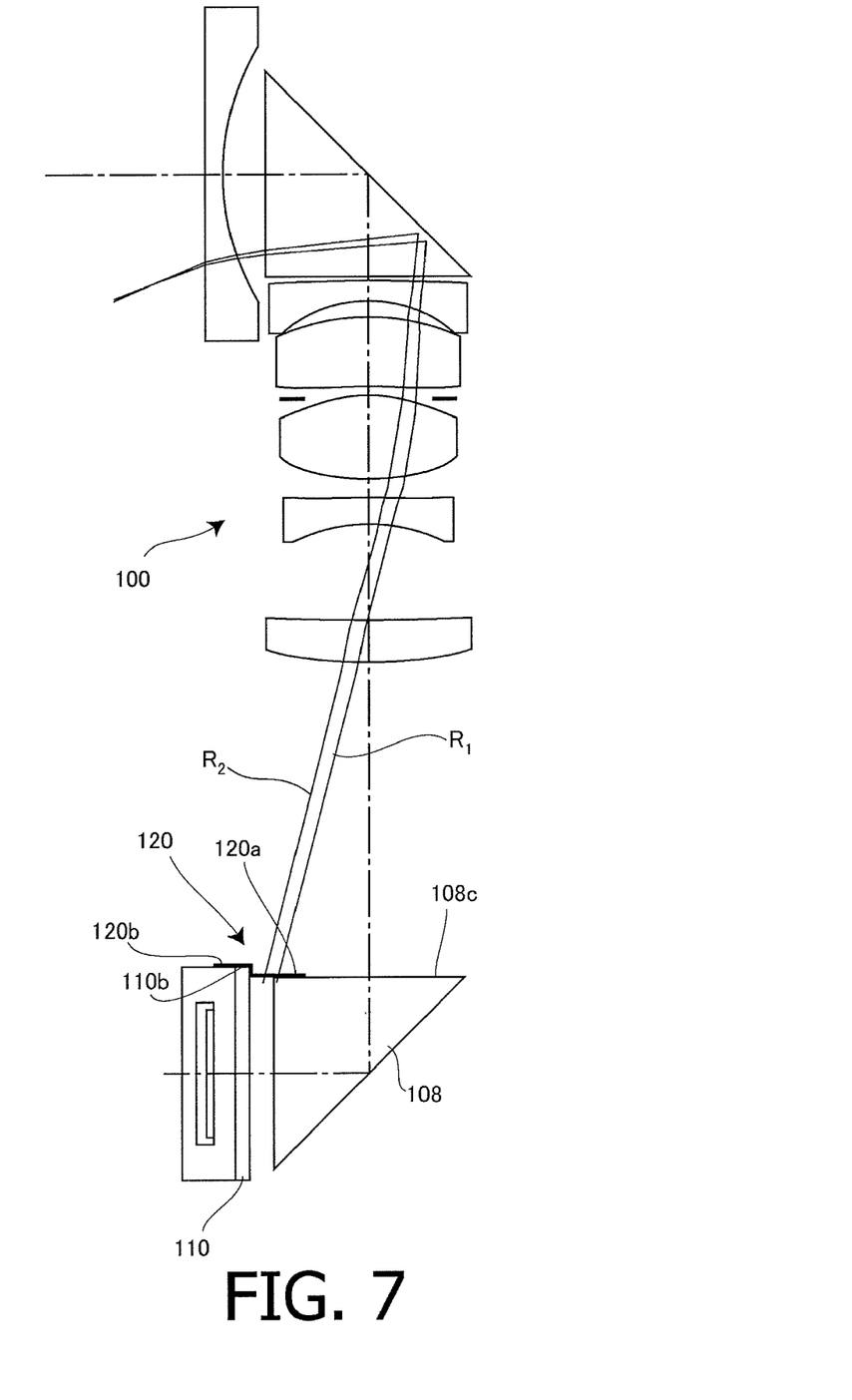
FIG. 7 is an explanatory illustration for explaining the relationship between a shielding member and light outside the field angle.

FIG. 7 is an explanatory illustration for explaining the relationship between the shielding member 120 and the light rays R1 and R2. As shown in FIG. 7, the first shielding part 120a blocks the light ray R1 proceeding to the entrance surface 108c of the image side prism 108. The second shielding part 120b blocks the light ray R2 directly entering from the imaging lens group 106 to a space between the image side prism 108 and the cover glass 110. By arranging the shielding member 120, it becomes possible to block the light outside the field angle, such as the light rays R1 and R2, while letting the normal light enter the effective pixel area of the sensor surface 22. Therefore, the light outside the field angle is prevented from appearing as a ghost or flare on the image. Consequently, deterioration of the image quality can be prevented.

In the followings, there concrete numeric examples (first to third examples) of the imaging optical system 100 installed in the imaging apparatus 1 are explained, and three comparative examples (first to third comparative examples) regarding the conventional imaging apparatus 200 are explained. The imaging optical system 100 according to each of the first to third examples has the common configuration on the object side with respect to the image side prism 108, and the common configuration is shown in FIG. 1. Therefore, in the drawings for showing the configurations of the first to third examples, only an optical configuration from the image side prism 108 is illustrated for the sake of simplicity. The conventional imaging apparatus 200 according to each of the first to third comparative examples has the common configuration on the object side with respect to the image side prism 208, and the common configuration is shown in FIG. 2. Therefore, in the drawings showing the configuration of the first to third comparative examples, only an optical configuration from the image side prism 108 is illustrated for the sake of simplicity. In the followings, to elements which are substantially the same as those of the above described embodiment, the same reference numbers are assigned and explanations thereof will not be repeated.

FIRST EXAMPLE

Figure 8A:
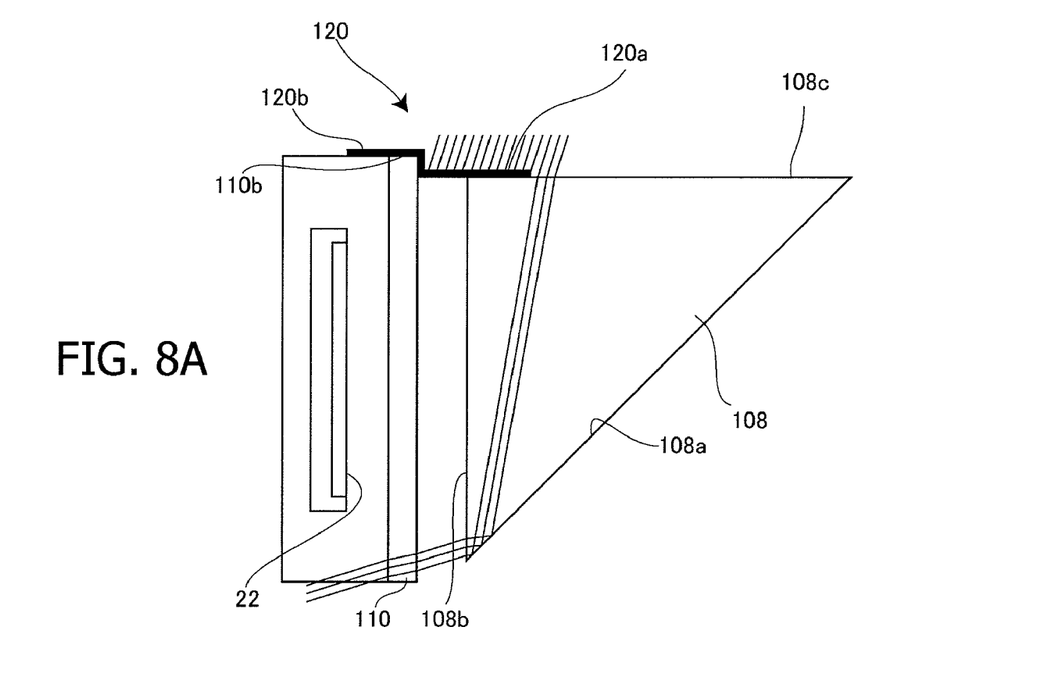
FIGS. 8A and 8B illustrate a configuration of an imaging optical system according to a first example.
Figure 8B:
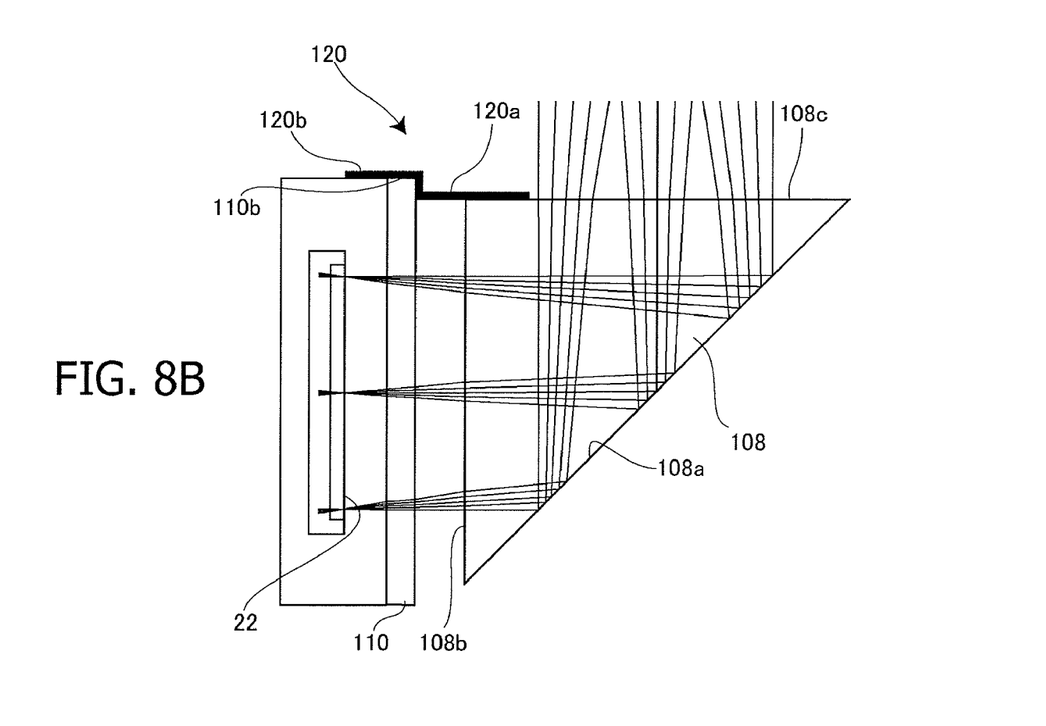

FIGS. 8A and 8B illustrate a configuration of the imaging optical system 100 according to the first example. FIG. 8A illustrates an optical path of the light outside the field angle, and FIG. 8B illustrates an optical path of the normal light. An incident angle of the light outside the field angle shown in FIG. 8A with respect to the entrance surface 108c is 17.6°. Table 1 shows the numerical configuration of the imaging optical system 100 according to the first example. In Table 1, "R" denotes the curvature radius (unit: mm) of each optical surface, "D" denotes the thickness of an optical component or the distance (unit: mm) from each optical surface to the next optical surface, "Nd" represents the refractive index at a d-line (the wavelength of 588 nm). The definitions regarding Tables and drawings of the first example are also applied to the following examples and comparative examples. In each of the first to third examples and the first to third comparative examples, each of the imaging lens groups 106 and 206 has the focal length of 8.6 mm, and the maximum image height in a cross sectional plane (YZ plane) in which the optical path is bent by the image side prism (108 or 208) is 1.38 mm.

TABLE 1

| Surface No. | R | D | Nd | Comments |
|---|---|---|---|---|
| 1 | ∞ | 0.5 | 1.7725 | Objective |
| 2 | 6.089 | 0.93 | 1 | Lens 102 |
| 3 | ∞ | 2.396 | 1.744 | Object Side |
| 4 | ∞ | 2.396 | | Prism 104 |
| 5 | ∞ | 0.1 | 1 | |
| 6 | 23.808 | 0.5 | 1.5168 | Imaging Lens |
| 7 | 3.032 | 0.38 | 1 | Group 106 |
| 8 | 5.231 | 1.632 | 1.60641 | |
| 9 | 32.635 | 0.2 | 1 | |
| 10 (Aperture Stop) | ∞ | 0 | | |
| 11 | 3.262 | 1.963 | 1.497 | |
| 12 | −4.761 | 0.451 | 1 | |
| 13 | 20.309 | 0.633 | 1.60641 | |
| 14 | 3.52 | 2.251 | 1 | |
| 15 | ∞ | 1.008 | 1.54358 | |
| 16 | −12.342 | 7.473 | 1 | |
| 17 | ∞ | 2.212 | 1.744 | Image Side |
| 18 | ∞ | 2.212 | | Prism 108 |
| 19 | ∞ | 0.5 | 1 | |
| 20 | ∞ | 0.4 | 1.51633 | Cover Glass 110 |
| 21 | ∞ | 0.5 | 1 | |
| 22 | ∞ | | | Sensor Surface 22 |

SECOND EXAMPLE

Figure 9A:
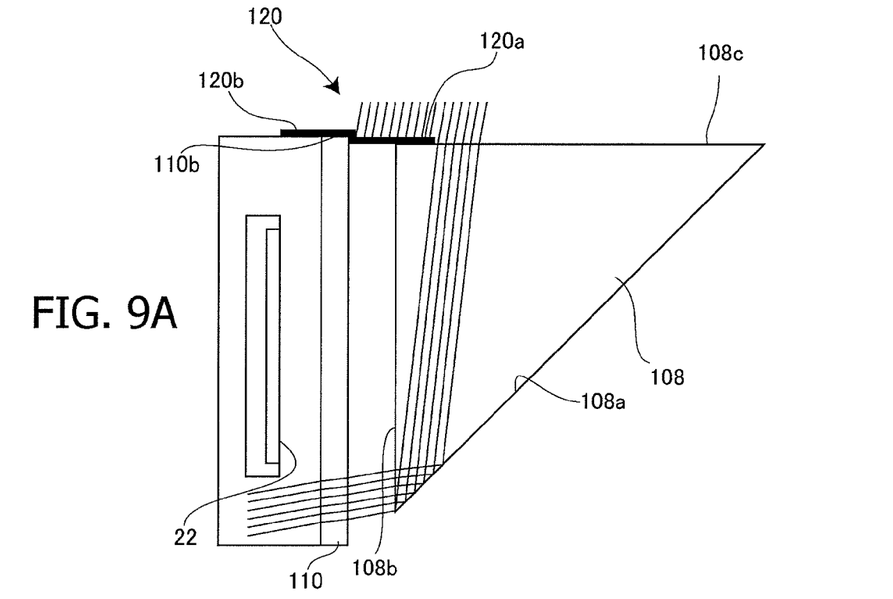
FIGS. 9A and 9B illustrate a configuration of an imaging optical system according to a second example.
Figure 9B:
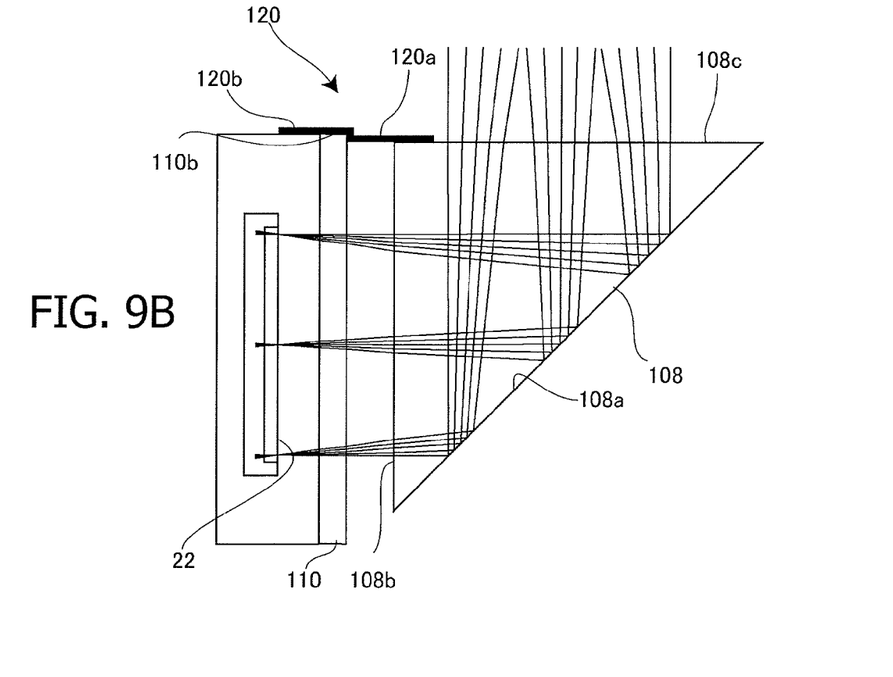

FIGS. 9A and 9B illustrate a configuration of the imaging optical system 100 according to the second example. FIG. 9A illustrates an optical path of the light outside the field angle, and FIG. 9B illustrates an optical path of the normal light. An incident angle of the light outside the field angle shown in FIG. 9A with respect to the entrance surface 108c is 10.3°. Table 2 shows the numerical configuration of the imaging optical system 100 according to the second example. In Table 2 (and in the following similar tables), surfaces #1 to #15 have the same numeric values as those of the surfaces #1 to #15 in Table 1, and explanations thereof will not be repeated.

TABLE 2

| Surface No. | R | D | Nd | Comments |
|---|---|---|---|---|
| 16 | −12.342 | 7.25 | 1 | |
| 17 | ∞ | 2.462 | 1.60311 | Image Side Prism 108 |
| 18 | ∞ | 1.962 | | |
| 19 | ∞ | 0.5 | 1 | |
| 20 | ∞ | 0.4 | 1.51633 | Cover Glass 110 |
| 21 | ∞ | 0.5 | 1 | |
| 22 | ∞ | | | Sensor Surface 22 |

THIRD EXAMPLE

Figure 10A:
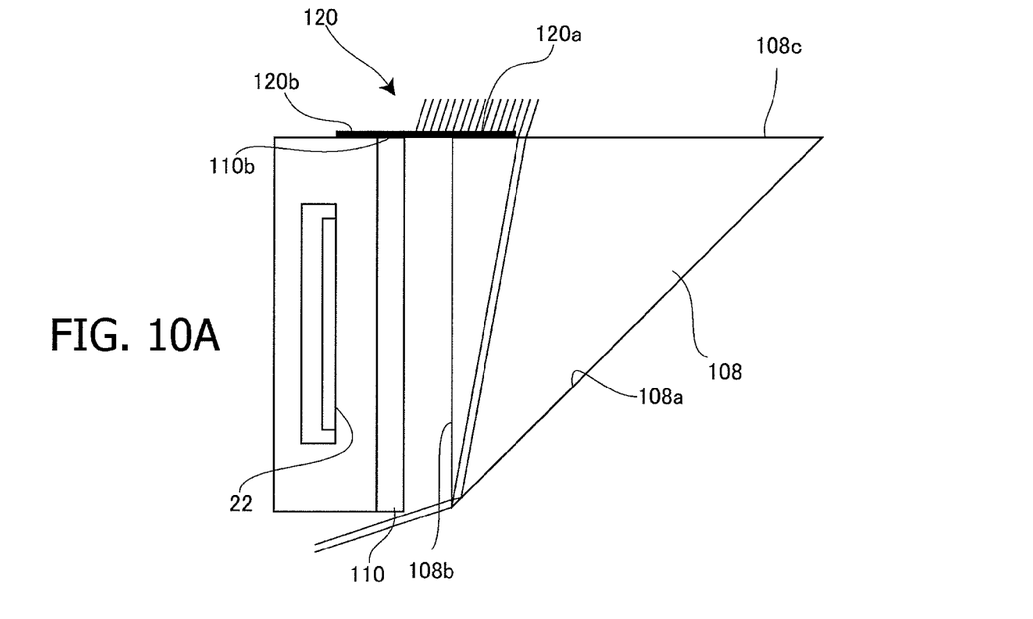
FIGS. 10A and 10B illustrate a configuration of an imaging optical system according to a third example.
Figure 10B:
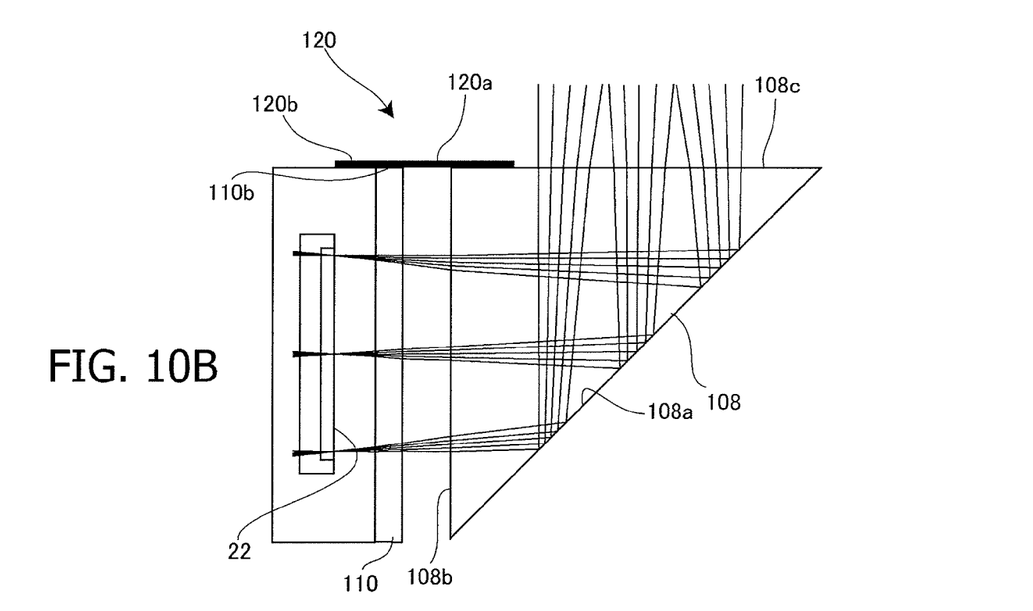

FIGS. 10A and 10B illustrate a configuration of the imaging optical system 100 according to the third example. FIG. 10A illustrates an optical path of the light outside the field angle, and FIG. 10B illustrates an optical path of the normal light. An incident angle of the light outside the field angle shown in FIG. 10A with respect to the entrance surface 108c is 17.6°. Table 3 shows the numerical configuration of the imaging optical system 100 according to the third example.

TABLE 3

| Surface No. | R | D | Nd | Comments |
|---|---|---|---|---|
| 16 | −12.342 | 7.142 | 1 | |
| 17 | ∞ | 2.5 | 1.744 | Image Side Prism 108 |
| 18 | ∞ | 2.5 | | |
| 19 | ∞ | 0.5 | 1 | |
| 20 | ∞ | 0.4 | 1.51633 | Cover Glass 110 |
| 21 | ∞ | 0.5 | 1 | |
| 22 | ∞ | | | Sensor Surface 22 |

The following Table 4 shows, for each of the first to third examples, values regarding the condition (1). As shown in Table 4, in each of the first to third examples, the length of the first shielding part 120a in the Z axis direction is equal to the height h.

TABLE 4

| | $1^{st}$ Example | $2^{nd}$ Example | $3^{rd}$ Example |
|---|---|---|---|
| Length L (mm) | 4.423 | 4.423 | 5.000 |
| Refractive index n | 1.000 | 1.000 | 1.000 |
| Refractive index n' | 1.74400 | 1.60311 | 1.74400 |
| Angle α (°) | 45.000 | 45.000 | 45.000 |
| Height h | 0.769 | 0.494 | 0.869 |

Figure 11:
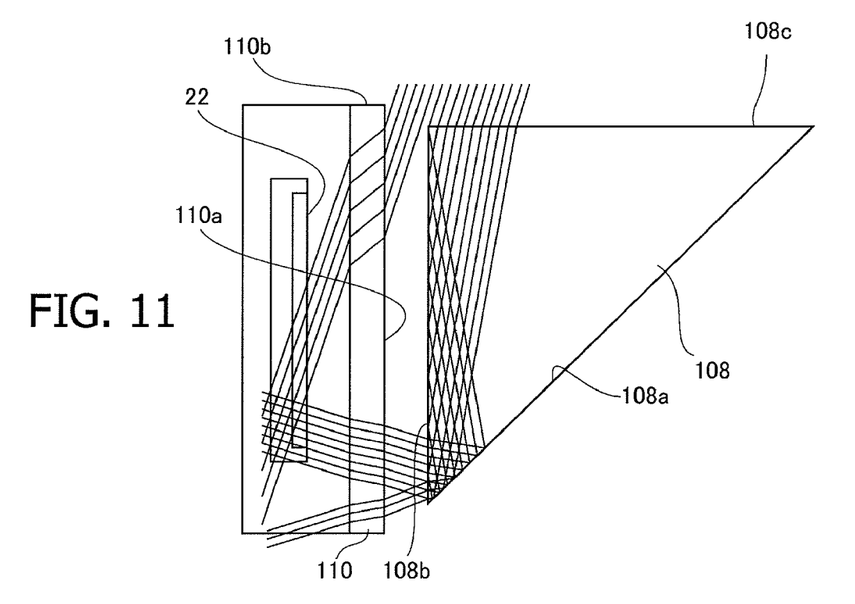
FIG. 11 illustrates a configuration of an imaging optical system according to a first comparative example.
Figure 12:
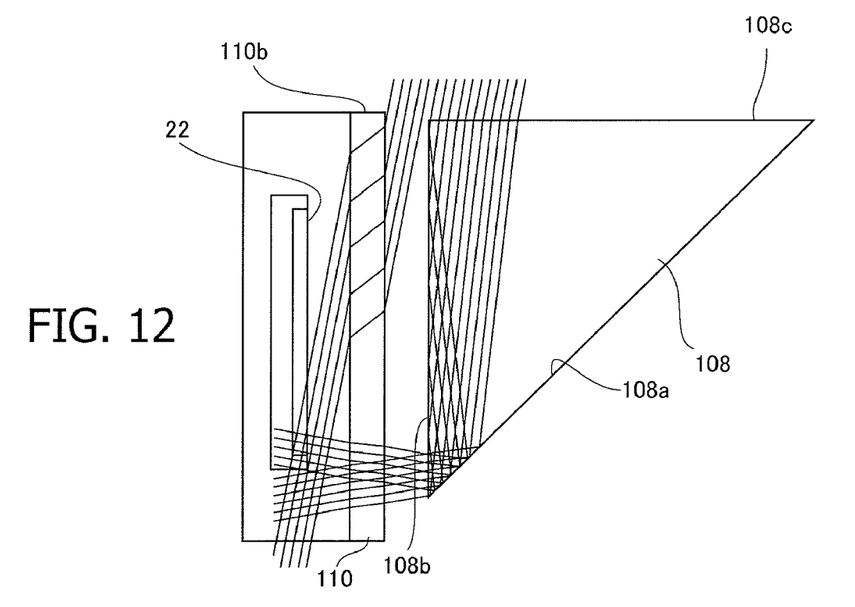
FIG. 12 illustrates a configuration of an imaging optical system according to a second comparative example.
Figure 13:
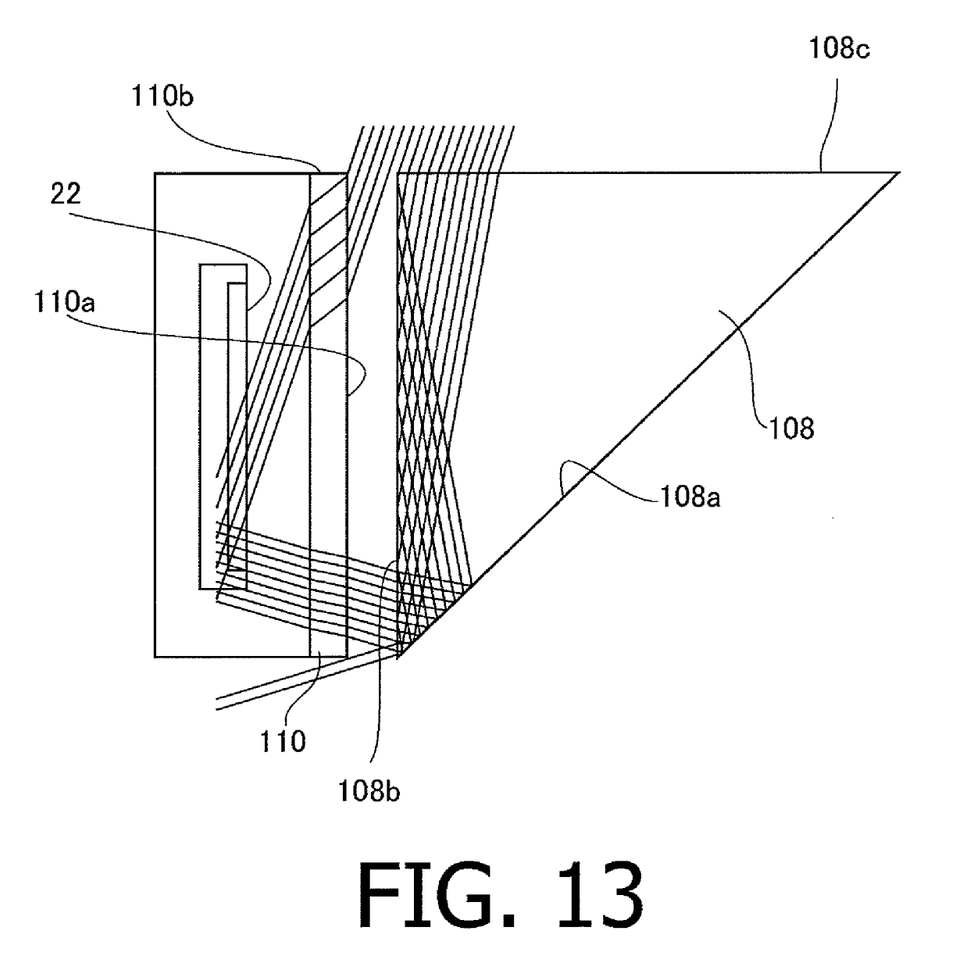
FIG. 13 illustrates a configuration of an imaging optical system according to a third comparative example.

FIGS. 11, 12 and 13 respectively illustrate configurations of the imaging optical system 200 according to first, second and third comparative examples. A concrete numerical configuration of the imaging optical system 200 according to the first comparative example is the same as that of the first example excepting the fact that the first comparative example does not have the shielding member 120. A concrete numerical configuration of the imaging optical system 200 according to the second comparative example is the same as that of the second example excepting the fact that the second comparative example does not have the shielding member 120. A concrete numerical configuration of the imaging optical system 200 according to the third comparative example is the same as that of the third example excepting the fact that the third comparative example does not have the shielding member 120. All of light rays illustrated in each of FIGS. 11 to 13 correspond to the light outside the field angle. The incident angle of the light outside the field angle shown in FIG. 11 with respect to the entrance surface 108c is the same as that shown in FIG. 8A. The incident angle of the light outside the field angle shown in FIG. 12 with respect to the entrance surface 108c is the same as that shown in FIG. 9A. The incident angle of the light outside the field angle shown in FIG. 13 with respect to the entrance surface 108c is the same as that shown in FIG. 10A.

As shown in FIGS. 11 to 13, the imaging optical system 200 according each of the first to third comparative examples does not have the shielding member 120. Therefore, the light outside the field angle which reflects from the exit surface 108b and the reflection surface 108a in this order or the light outside the field angle directly incident on the cover glass 210 from the imaging lens group 206 enters the effective pixel area of the sensor surface 22. Therefore, the quality of an image is considerably deteriorated by a ghost or flare. By contrast, in the imaging optical system 100 according to each of the first to third examples, the above described light outside the field angle is blocked by the shielding member 120. Therefore, occurrence of a ghost or flare is prevented, and the quality of an image can be enhanced.

Although the present invention has been described in considerable detail with reference to certain preferred embodiments thereof, other embodiments are possible.

For example, the object side prism 104 may be substituted by a mirror serving to bend an optical path. The object side prism 104 may not be arranged at the position on the object side with respect to the imaging lens group 106. For example, the object side prism 104 may be arranged at a position between lenses constituting the imaging lens group 106.

In the above described embodiment, the first shielding part 120a has the size for shielding the whole region defined from the edge line e to the position of the height h on the entrance surface 108c. In this case, the light outside the field angle which totally reflects from the exit surface 108b and the reflection surface 108a in this order and then enters the effective pixel area on the sensor surface 22 results principally from the light entering to the above described region defined from the edge line e to the position of the height h on the entrance surface 108c. By shielding at least a part of the above described region defined from the edge line e to the position of the height h on the entrance surface 108c, it is possible to suppress deterioration of the quality of an image by the light outside the field angle of the above described type. Therefore, in another embodiment, the first shielding part 120a may have the size for shielding only a part of the above described region defined from the edge line e to the position of the height h on the entrance surface 108c.

In the above described embodiment, the shielding member 120 blocks the light outside the field angle entering the region defined from the edge line e to the position of the height h on the entrance surface 108c, the light outside the field angle entering from the imaging lens group 106 side to a space between the image side prism 108 and the cover glass 110, and the light outside the field angle entering to the side surface 110b of the cover glass 110. As long as the shielding member 120 serves to block the above described light outside the field angle, the installation position of the shielding member 120 is not limited. In another embodiment, the shielding member 120 may not be adhered to the image side prism 108 or the cover glass 110. For example, the shielding member 120 may be arranged at a position between the image side prism 108 and one of the imaging lens group 106 closest to the image plane.

This application claims priority of Japanese Patent Application No. P2010-214151, filed on Sep. 24, 2010. The entire subject matter of the applications is incorporated herein by reference.

What is claimed is:

1. An imaging optical system, comprising:
an imaging lens group having at least one lens;
an image side prism having an entrance surface on which light passed through the imaging lens group is incident, a reflection surface from which the light passed through the entrance surface reflects, and an exit surface from which the light reflected from the reflection surface exits toward an image pickup device located at a predetermined position; and
a first shielding member formed to shield at least a part of a region on the entrance surface of the image side prism, wherein the region on the entrance surface is located from an edge line of an apex between the entrance surface and the exit surface to a position corresponding to a height h from the edge line,
wherein when L represents a length of the exit surface defined in a cross sectional plane orthogonal to both of the entrance surface and the exit surface, α represents an angle formed in the cross sectional plane between the reflection surface and the exit surface, n represents a refractive index of a surrounding area of the image side prism, and n' represents a refractive index of the image side prism, the height h satisfies a following condition (1):

$$h = L \times \cos\{\alpha + \sin^{-1}(n/n')\} \quad (1).$$

2. The imaging optical system according to claim 1, wherein the first shielding member is located between the image side prism and one of lenses of the imaging lens group closest to an image plane of the imaging lens group.

3. The imaging optical system according to claim 1, wherein the first shielding member is attached to the entrance surface of the image side prism.

4. The imaging optical system according to claim 1, further comprising:
a cover glass provided for the image pickup device to transmit light emerging from the exit surface of the image side prism toward the image pickup device; and
a second shielding member that blocks light incident directly on the cover glass from the imaging lens group without passing through the image side prism.

5. The imaging optical system according to claim 4, wherein the second shielding member is located between one of lenses of the imaging lens group closest to an image plane of the imaging lens group and at least one of a space between the image side prism and the cover glass and a side face of the cover glass facing the one of lenses of the imaging lens group closest to the image plane.

6. The imaging optical system according to claim 5, wherein the second shielding member is attached to the side face of the cover glass.

7. The imaging optical system according to claim 4, wherein the second shielding member is integrated with the first shielding member.

8. The imaging optical system according to claim 1, wherein the reflection surface of the image side prism is provided with one of an antireflection coating and an antireflection structure.

9. The imaging optical system according to claim 1, wherein the image side prism is a right angle prism formed to bend an optical path by approximately 90°.

10. The imaging optical system according to claim 1, further comprising an object side prism located on an object side with respect to the image side prism, the object side prism being arranged such that at least one lens of lenses of the imaging lens group is located between the object side prism and the image side prism.

11. The imaging optical system according to claim 10, wherein the object side prism is a right angle prism formed to bend an optical path by approximately 90°.

12. An imaging apparatus, comprising:
an imaging optical system; and
an image pickup device,
wherein the imaging optical system includes:
an imaging lens group having at least one lens;
an image side prism having an entrance surface on which light passed through the imaging lens group is incident, a reflection surface from which the light passed through the entrance surface reflects, and an exit surface from which the light reflected from the reflection surface exits toward the image pickup device located at a predetermined position; and
a first shielding member formed to shield at least a part of a region on the entrance surface of the image side prism, wherein the region on the entrance surface is located from an edge line of an apex between the entrance surface and the exit surface to a position corresponding to a height h from the edge line,
wherein when L represents a length of the exit surface defined in a cross sectional plane orthogonal to both of the entrance surface and the exit surface, $\alpha$ represents an angle formed in the cross sectional plane between the reflection surface and the exit surface, n represents a refractive index of a surrounding area of the image side prism, and n' represents a refractive index of the image side prism, the height h satisfies a following condition (1):

$$h = L \times \cos\{\alpha + \sin^{-1}(n/n')\} \tag{1}$$

wherein the image pickup device is arranged such that a sensor surface of the image pickup device is positioned on an image plane of the imaging optical system.

13. The imaging apparatus according to claim 12, wherein the first shielding member is located between the image side prism and one of lenses of the imaging lens group closest to an image plane of the imaging lens group.

14. The imaging apparatus according to claim 12, wherein the first shielding member is attached to the entrance surface of the image side prism.

15. The imaging apparatus according to claim 12, wherein the imaging optical system further comprises:
a cover glass provided for the image pickup device to transmit light emerging from the exit surface of the image side prism toward the image pickup device; and
a second shielding member that blocks light incident directly on the cover glass from the imaging lens group without passing through the image side prism.

16. The imaging apparatus according to claim 15, wherein the second shielding member is located between one of lenses of the imaging lens group closest to an image plane of the imaging lens group and at least one of a space between the image side prism and the cover glass and a side face of the cover glass facing the one of lenses of the imaging lens group closest to the image plane of the imaging lens group.

17. The imaging apparatus according to claim 16, wherein the second shielding member is attached to the side face of the cover glass.

18. The imaging apparatus according to claim 15, wherein the second shielding member is integrated with the first shielding member.

19. The imaging apparatus according to claim 12, wherein the reflection surface of the image side prism is provided with one of an antireflection coating and an antireflection structure.

20. The imaging apparatus according to claim 12, wherein the image side prism is a right angle prism formed to bend an optical path by approximately 90°.

21. The imaging apparatus according to claim 12, wherein the imaging optical system further comprises an object side prism located on an object side with respect to the image side prism, the object side prism being arranged such that at least one lens of lenses of the imaging lens group is located between the object side prism and the image side prism.

22. The imaging apparatus according to claim 21, wherein the object side prism is a right angle prism formed to bend an optical path by approximately 90°.

* * * * *